United States Patent
Bono (10) Patent No.: US 8,293,413 B2
(45) Date of Patent: Oct. 23, 2012

(54) FUEL CELL SYSTEM INCLUDING A CONTROLLER COMPRISING A COOLING SECTION ABNORMALITY DETERMINING UNIT

(75) Inventor: Tetsuya Bono, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 640 days.

(21) Appl. No.: 12/303,138

(22) PCT Filed: Jun. 29, 2007

(86) PCT No.: PCT/JP2007/063521
§ 371 (c)(1),
(2), (4) Date: Dec. 2, 2008

(87) PCT Pub. No.: WO2008/013038
PCT Pub. Date: Jan. 31, 2008

(65) Prior Publication Data
US 2009/0317678 A1  Dec. 24, 2009

(30) Foreign Application Priority Data
Jul. 26, 2006 (JP) .................. 2006-203773

(51) Int. Cl.
*H01M 8/04* (2006.01)
(52) U.S. Cl. ........ 429/428; 429/433; 429/434; 429/439; 429/442
(58) Field of Classification Search ............ None
See application file for complete search history.

(56) References Cited

FOREIGN PATENT DOCUMENTS

| JP | 2002-184435 A | 6/2002 |
|---|---|---|
| JP | 2003-129961 A | 5/2003 |
| JP | 2004-273347 A | 9/2004 |
| JP | 2005-251694 A | 9/2005 |
| JP | 2005-259402 A | 9/2005 |
| JP | 2005-332768 A | 12/2005 |
| JP | 2006-092860 A | 4/2006 |
| JP | 2006-196402 A | 7/2006 |
| JP | 2006-278158 A | 10/2006 |

OTHER PUBLICATIONS

Machine translation of JP 2005-259402, Mori Hidefumi, Sep. 22, 2005.*
Machine translation of JP 2003-129961, Takeda et al., May 8, 2003.*
Machine translation of JP 2004-273347, Kobayashi et al., Sep. 30, 2004.*
Office Action issued Nov. 12, 2010 in Chinese Patent Application No. 200780028414.3 and English translation of relevant parts.
Office Action issued Jul. 20, 2011 in German Patent Application No. 11 2007 001 734.1-45 and English translation thereof.

* cited by examiner

*Primary Examiner* — Barbara Gilliam
*Assistant Examiner* — Kwang Han
(74) *Attorney, Agent, or Firm* — Kenyon & Kenyon LLP (57) ABSTRACT

A fuel cell system is provided with an air compressor for supplying a fuel cell stack with air; a temperature sensor for detecting the temperature of air in the gas downstream from an intercooler, at the middle of an oxidation gas supplying channel; and a control section. The control section is provided with a cooling section abnormality determining unit for determining presence or absence of an abnormality of a first cooling water pump, and an air compressor operation controlling unit for controlling the rotational speed of the air compressor in accordance with the air temperature detected by the temperature sensor when it is determined that an abnormality has occurred.

7 Claims, 5 Drawing Sheets

FUEL CELL SYSTEM INCLUDING A CONTROLLER COMPRISING A COOLING SECTION ABNORMALITY DETERMINING UNIT

This is a 371 national phase application of PCT/JP2007/063521 filed 29 Jun. 2007, claiming priority to Japanese Patent Application No. JP 2006-203773 filed 26 Jul. 2006, the contents of which are incorporated herein by reference.

TECHNICAL FIELD

The present invention relates to a fuel cell system having a fuel cell stack which generates power through electrochemical reaction of reaction gases, a gas supply channel for supplying the reaction gases to the fuel cell stack, and an intercooler provided on the gas supply channel.

BACKGROUND ART

In a fuel cell stack, as one example, a membrane-electrode assembly (MEA) is formed with an anode-side electrode, an electrolyte membrane, and a cathode-side electrode, a fuel battery cell is formed with the membrane-electrode assembly and a separator, and a plurality of fuel battery cells are layered to form a fuel battery cell layered structure. More specifically, each fuel battery cell is formed by placing the anode-side electrode on one surface of the electrolyte membrane formed by a polymer ion exchange membrane and the cathode-side electrode on the other surface, and providing separators on both sides. A fuel cell stack which generates a high voltage is formed by layering a plurality of the fuel battery cells and sandwiching the plurality of fuel battery cells with a collector plate, an insulating plate, and an end plate.

In such a fuel cell, a fuel gas such as, for example, a gas including hydrogen is supplied to the anode-side electrode and an oxidation gas such as, for example, air is supplied to the cathode-side electrode. With this process, the fuel gas and the oxidation gas are supplied for reaction in the cell, an electromotive force is generated, and water is produced at the cathode-side electrode.

A gas supply channel for supplying oxygen gas to the fuel cell stack is provided and an air compressor which is a gas compressor is provided upstream of the gas supply channel. A configuration has been considered in which an intercooler is provided partway on the gas supply channel, between the air compressor and the fuel cell so that, even when the temperature of the oxidation gas such as air compressed by the air compressor is increased, the oxidation gas is cooled and introduction, into the fuel cell stack, of a high-temperature oxidation gas having an excessively increased temperature is prevented. More specifically, if the oxidation gas having the excessively increased temperature is introduced to the fuel cell stack, constituent elements of the fuel cell stack such as the electrolyte membrane in the fuel cell stack may be thermally degraded. However, when an intercooler is provided, thermal degradation may be effectively prevented. When an intercooler is provided, a coolant channel for cooling the intercooler and a coolant pump on a partway on the coolant channel are also provided. In addition, the coolant such as cooling water is circulated through the coolant channel by the coolant pump.

Even when the intercooler is provided in the fuel cell system as described above, if an abnormality such as failure occurs in the constituent elements of a cooling section for cooling the intercooler, such as the coolant pump, it may not be possible for the intercooler to prevent excessive temperature increase in the oxidation gas to be sent to the fuel cell stack. In consideration of this, in a fuel cell system described in JP 2002-184435 A, when occurrence of an abnormality in the cooling system for cooling a heat exchange device which corresponds to the intercooler is detected, a controlling device stops the air compressing device. Because of this structure, when an abnormality occurs in the cooling system of the heat exchange device, the power generation operation by the fuel cell is always stopped, irrespective of other conditions.

However, even when an abnormality occurs in the cooling system of the heat exchange device for cooling the gas to be sent to the fuel cell, no problem is presented by continuing to generate power in the fuel cell if the temperature of the oxidation gas to be sent to the fuel cell is not excessively increased.

In view of these circumstances, the present inventors have conceived that the power generation operation time of the fuel cell can be extended if power can be generated in the case where there is no problem in the power generation by the fuel cell would not present a problem even when an abnormality occurs in the cooling section of the heat exchange device.

An object of the present invention is to provide a fuel cell system in which the power generation operation time of the fuel cell can be extended by allowing power generation when there is no problem in power generation by the fuel cell even when an abnormality occurs in the cooling section of the intercooler including the coolant pump.

DISCLOSURE OF INVENTION

According to one aspect of the present invention, there is provided a fuel cell system comprising a fuel cell which generates power through an electrochemical reaction of reaction gases, a gas supply channel through which the reaction gas is supplied to the fuel cell, a gas supplying device provided on the gas supply channel, a temperature detecting unit which detects a temperature of the reaction gas, an intercooler which cools a gas which has passed through the gas supplying device, a coolant channel through which a coolant which cools the intercooler flows, a coolant pump provided on the coolant channel, and a controller, wherein the controller comprises a cooling section abnormality determining unit which determines presence or absence of an abnormal state of a cooling section of the intercooler including the coolant pump, and a gas supplying device operation controlling unit which controls, when it is determined that an abnormality has occurred in the cooling section of the intercooler, an operation state of the gas supplying device according to a temperature of the reaction gas detected by the temperature detecting unit.

According to another aspect of the present invention, it is preferable that, in the fuel cell system, the gas supplying device is a gas compressor, and the gas supplying device operation controlling unit controls, when it is determined that an abnormality has occurred in the cooling section of the intercooler, a rotational speed of the gas compressor so that the temperature of the reaction gas is less than or equal to a predetermined value according to the temperature of the reaction gas detected by the temperature detecting unit.

According to another aspect of the present invention, it is preferable that, in the fuel cell system, the gas supplying device is a gas compressor, and the gas supplying device operation controlling unit controls, when it is determined that an abnormality has occurred in the cooling section of the intercooler, a rotational speed of the gas compressor based on the temperature of the reaction gas detected by the temperature detecting unit and data of a map indicating a maximum allowable rotational speed of the gas compressor which is set corresponding to the temperature of the reaction gas or a related value of the maximum allowable rotational speed.

According to another aspect of the present invention, it is preferable that, in the fuel cell system, a humidifier is provided upstream of gas than the fuel cell and downstream of gas than the intercooler on the gas supply channel, and the temperature detecting unit detects the temperature of the reaction gas upstream than the humidifier on the gas supply channel.

With the fuel cell system of the present invention, it is possible to extend the time in which the fuel cell operates to generate power while preventing supply of reaction gas having the excessively increased temperature to the fuel cell because the controller comprises the cooling section abnormality determining unit which determines presence or absence of the abnormality state of the cooling section of the intercooler including the coolant pump and the gas supplying device operation controlling unit which controls, when it is determined that an abnormality has occurred in the cooling section of the intercooler, the operation state of the gas supplying device according to the temperature of the reaction gas detected by the temperature detecting unit. Because such a structure is employed, the power generation operation time of the fuel cell can be extended compared to the case of the fuel cell system described in JP 2002-184435 A, in which the power generation operation by the fuel cell is stopped when an abnormality occurs in the cooling section of the intercooler, irrespective of other conditions.

When a vehicle is equipped with a fuel cell system of any of the various aspects of the present invention to form a fuel cell vehicle, it is possible to prevent continuation of the state of stopping of the fuel cell vehicle when an abnormality occurs in the cooling section of the intercooler, and to easily execute a "limp home" driving mode in which the fuel cell vehicle is driven to a repair factory or a safe side road without towing or transporting the fuel cell vehicle with other vehicles such as a towing vehicle. In addition, it is also possible to extend the time in which the power generation operation in which the power can be increased can be executed and to shorten the time required for the limp home driving mode.

In the case of the fuel cell system described in JP 2003-129961 A, the compressor which supplies air to the fuel cell is formed by two stages including a low-pressure compressor and a high-pressure compressor, the compressed air is supplied to the fuel cell during normal driving by supplying the air through the two stages of the low-pressure compressor and the high-pressure compressor, and the compressed air is supplied to the fuel cell when the load of the fuel cell is reduced by supplying the air through the low-pressure compressor and not through the high-pressure compressor. The temperature of the output air of the compressor is matched to the operation temperature of the fuel cell.

However, unlike the present invention, the fuel cell system described in JP 2003-129961 A does not consider allowing power generation by the fuel cell when an abnormality occurs in the cooling section of the intercooler which cools the air to be supplied to the fuel cell. Even when an abnormality occurs in the cooling section, during the normal driving in which the load of the fuel cell is not reduced, the air compressed by the low-pressure compressor may be sent to the high pressure compressor, and the air having the excessively increased temperature may be sent to the fuel cell. Unlike the present invention, the fuel cell system of JP 2003-129961 A does not have a structure to control the operation state of the gas supplying device according to the temperature of the reaction gas detected by the temperature detecting unit when an abnormality occurs in the cooling section of the intercooler which cools the air to be sent to the fuel cell.

In the case of a fuel cell system described in JP 2005-251694 A, in order to measure an external air temperature in place of the air density of the external air, and, in order to obtain a supply rate of air corrected according to the external air temperature, the rotational speed of the compressor is controlled and the power generation response time of the fuel cell based on the rotational speed is estimated. However, unlike the present invention, the fuel cell system described in JP 2005-251694 A does not even have the intercooler which cools the air which has passed through the gas supplying device. Thus, the fuel cell system does not have the structure which controls the operation state of the gas supplying device according to the temperature of the reaction gas detected by the temperature detecting unit when an abnormality has occurred in the cooling section which cools the intercooler.

BEST MODE FOR CARRYING OUT THE INVENTION

[First Preferred Embodiment]

Figure 1:
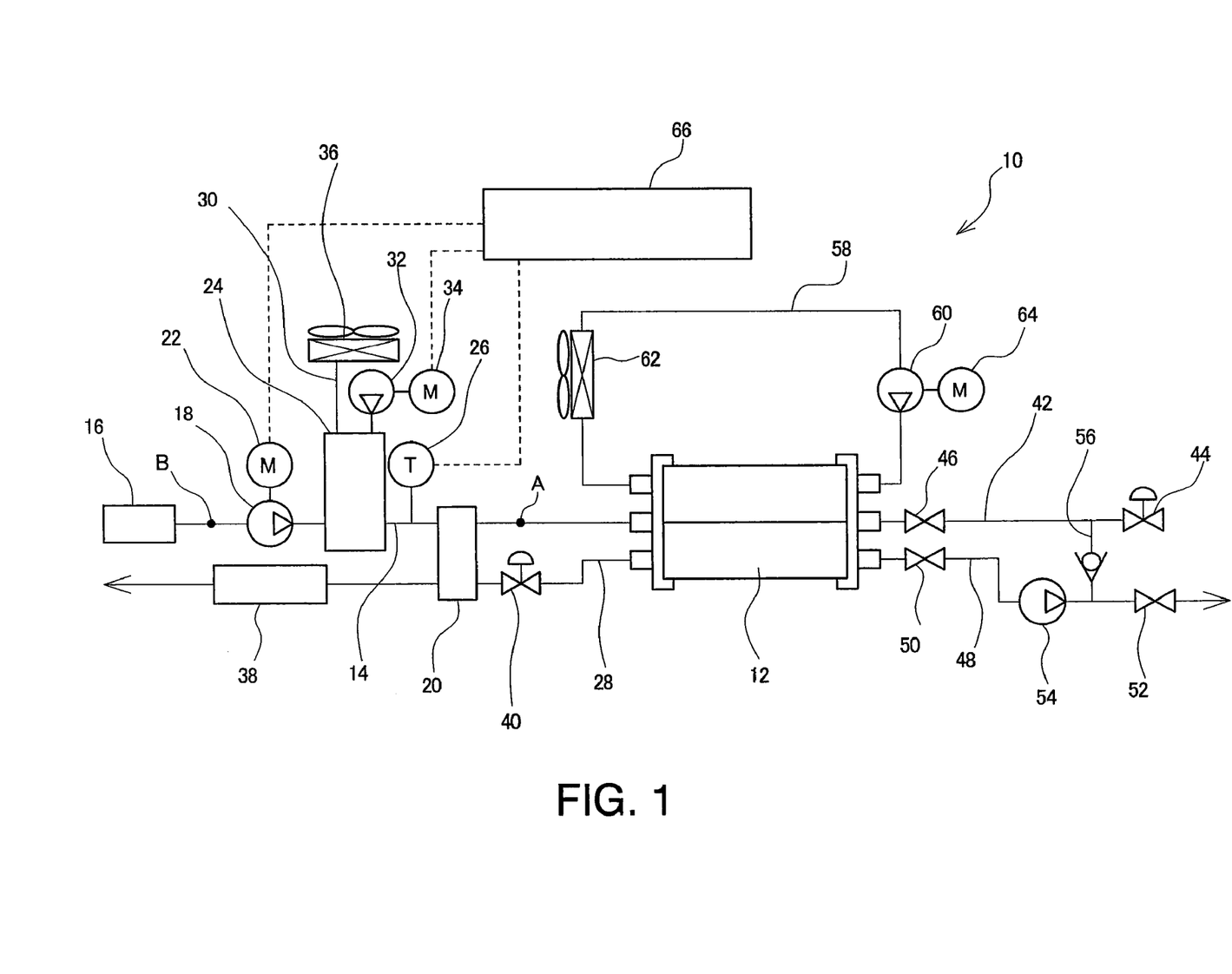
FIG. 1 is a diagram showing a basic structure of a fuel cell system in a first preferred embodiment of the present invention.
Figure 2:
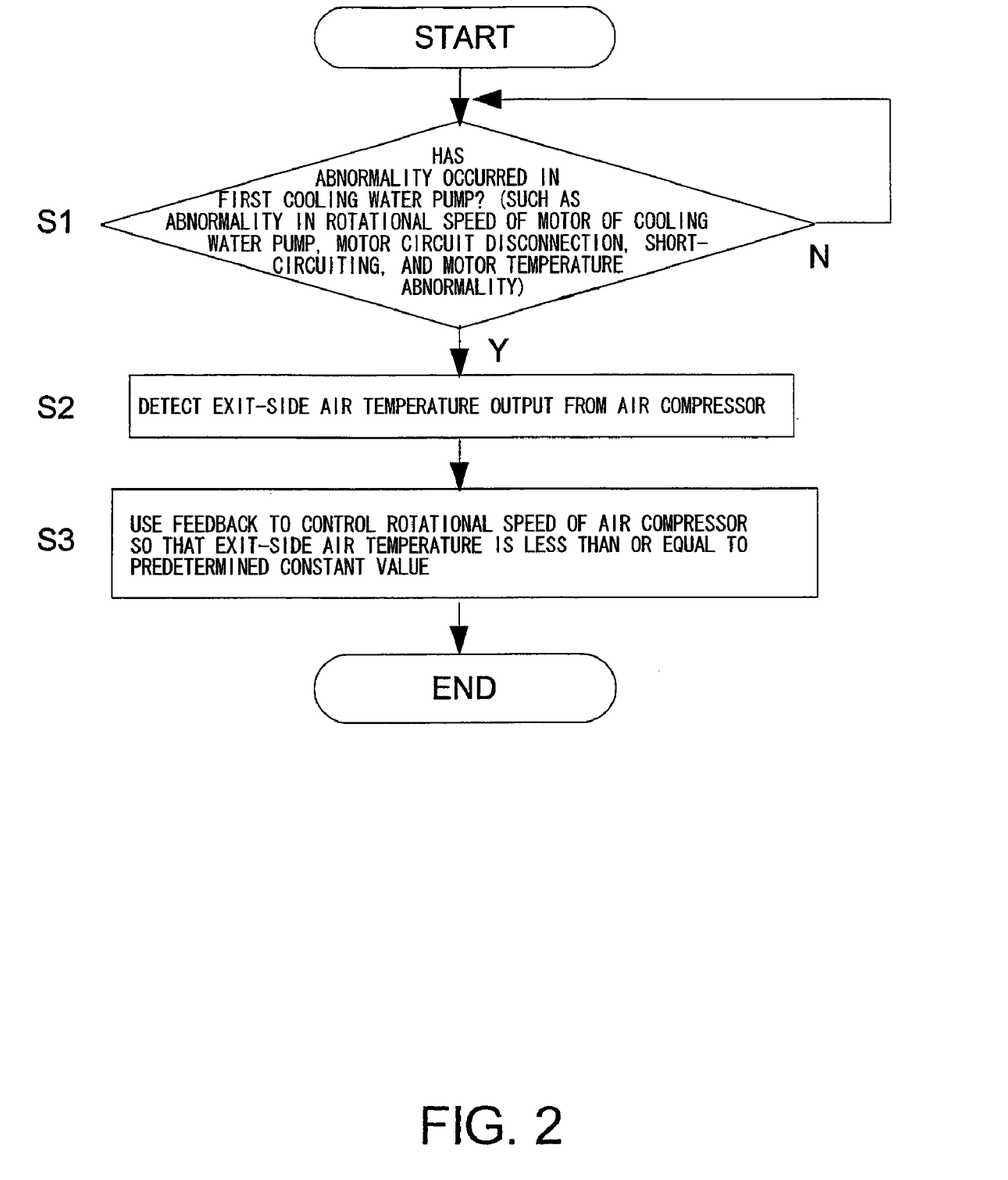
FIG. 2 is a flowchart for explaining a method for controlling the rotational speed of an air compressor in a first preferred embodiment of the present invention.

Preferred embodiments of the present invention will now be described in detail with reference to the drawings. FIGS. 1 and 2 show a first preferred embodiment of the present invention. FIG. 1 schematically shows a structure of the present embodiment.

A fuel cell system 10 is used equipped on a fuel cell vehicle, and comprises a fuel cell stack 12. In the fuel cell stack 12, a plurality of fuel battery cells are layered to form a fuel battery cell layered structure, and a collector plate and an end plate are provided on both ends of the layering direction of the fuel battery cell layered structure. The fuel battery cell layered structure, the collector plate, and the end plate are tightened by a tie-rod, a nut, etc. An insulating plate may be provided between the collector plate and the end plate.

Although the details of each fuel battery cell is not shown, each fuel battery cell may comprise, for example, a membrane-assembly formed by sandwiching an electrolyte membrane by an anode-side electrode and a cathode-side electrode and separators on both sides of the assembly. Hydrogen gas which is the fuel gas can be supplied to the anode-side electrode and air which is the oxidation gas can be supplied to the cathode-side electrode. Hydrogen ions generated by a catalyst reaction on the anode-side electrode are moved to the cathode-side electrode through the electrolyte membrane, so that a battery chemical reaction occurs with oxygen on the cathode-side electrode and water is produced. By moving electrons from the anode-side electrode through an external circuit, which is not shown, to the cathode-side electrode, an electromotive force is generated. The fuel gas and the oxidation gas correspond to reaction gases.

Inside the fuel cell stack 12, an internal coolant channel which is not shown is provided near the separator. A configuration is employed in which cooling water which is a coolant flows through the internal coolant channel so that, even when the temperature is increased due to heat generation involved in the power generation by the fuel cell stack 12, the temperature is not excessively increased.

In order to supply air, which is the oxidation gas, to the fuel cell stack 12, an oxidation gas supply channel 14 is provided. An air cleaner 16 is provided at a upstream section of the gas of the oxidation gas supply channel 14 so that the external air is taken in through the air cleaner 16 to the oxidation gas supply channel 14, the air is supplied to an air compressor 18 which is a gas compressor, the air is pressurized by the air compressor 18, and the air is humidified by a humidifier 20. The air compressor 18 is driven by a motor 22. The humidified air is supplied to the oxidation gas internal channel on the side of the cathode-side electrode of the fuel cell stack 12. Along the oxidation gas supply channel 14, an intercooler 24 is provided between the air compressor 18 and the humidifier 20, so that the air which has passed through the air compressor 18 is cooled by the intercooler 24. In addition, on the oxidation gas supply channel 14, a temperature sensor 26 which is a temperature detecting unit is provided in order to detect an exit-side air temperature which is a temperature of the air at the side of the exit of the air compressor 18 between the intercooler 24 and the humidifier 20.

The humidifier 20 has a function of providing moisture contained in the air discharged from the fuel cell stack 12 to an oxidation gas discharge channel 28 to the air before being supplied to the fuel cell stack 12, to humidify the air. For example, the humidifier 20 provides moisture to gas having a lower moisture content by allowing moisture in a gas having a greater moisture content to pass through the hollow fiber membrane when gases having different moisture contents are supplied to an inner side and an outer side of a plurality of hollow fiber membrane.

A first coolant channel 30 through which cooling water which is a coolant flows is provided in order to cool the intercooler 24, and the cooling water is circulated in the first coolant channel 30 by a first cooling water pump 32 which is a coolant pump provided partway on the first coolant channel 30. The first cooling water pump 32 is configured so that the output flow rate can be changed by driving by a motor 34 having an adjustable rotation speed. A first radiator 36 for cooling the cooling water is provided partway on the first coolant channel 30. The cooling water is pumped by the first cooling water pump 32 and is supplied to the intercooler 24, so that, when the temperature of the intercooler 24 is increased, the intercooler 24 is cooled. In the case of the present embodiment, a cooling section of the intercooler 24 is formed with the first coolant channel 30, the first cooling water pump 32, and the first radiator 36.

The air which is supplied to the fuel cell stack 12 and which is supplied for a battery chemical reaction in the each fuel battery cell is discharged from the fuel cell stack 12 through the oxidation gas discharge channel 28, passes through the humidifier 20 and a muffler 38, and is discharged to the atmosphere. A pressure control valve 40 is provided upstream of the humidifier 20, partway on the oxidation gas discharge channel 28, so that a supply pressure of air which is sent to the fuel cell stack 12 is controlled to a suitable pressure value corresponding to an operation state of the fuel cell stack 12. The muffler 38 has a function to reduce the sound produced when the gas is discharged.

A fuel gas supply channel 42 is provided for supplying the hydrogen gas, which is the fuel gas, to the fuel cell stack 12. The hydrogen gas supplied from a hydrogen gas supplying device, such as a high-pressure hydrogen tank which is not shown, to the fuel gas supply channel 42 is supplied through a fuel control valve 44 and an entrance open/close valve 46 to the fuel cell stack 12. The hydrogen gas which is supplied to the fuel gas channel on the side of the anode-side electrode of the fuel cell stack 12 and which is supplied to the battery chemical reaction is discharged from the fuel cell stack 12 to the fuel gas discharge channel 48 and is then discharged through a first exit open/close valve 50 and a second exit open/close valve 52. A hydrogen pump 54 is provided partway on the fuel gas discharge channel 48, to pump the hydrogen gas discharged from the fuel cell stack 12.

A circulation channel 56 which is connected to the fuel gas supply channel 42 is provided downstream of the hydrogen pump 54 of the fuel gas discharge channel 48, so that when the second exit open/close valve 52 is closed, the hydrogen gas pumped by the hydrogen pump 54 is returned through the circulation channel 56 to the fuel gas supply channel 42.

In order to cool the fuel cell stack 12, a second coolant channel 58 which is in communication with the internal coolant channel of the fuel cell stack 12 is provided. A second cooling water pump 60 and a second radiator 62 are provided partway on the second coolant channel 58. The second cooling water pump 60 circulates the cooling water in the second coolant channel 58. The second cooling water pump 60 is configured such that the output flow rate can be changed by driving with a motor 64 having an adjustable rotation speed.

In order to determine whether or not an abnormality, such as a failure of the first cooling water pump 32 provided on the first coolant channel 30 for cooling the intercooler 24, has occurred, a controller 66 is provided. The controller 66 comprises a cooling section abnormality determining unit which determines whether or not an abnormality such as a failure of the first cooling water pump 32, and an air compressor operation controlling unit, that is, a gas supplying device operation controlling unit, which controls a rotational speed of the air compressor 18 which is an operation state of the air compressor 18. The controller 66 controls the pressure control valve 40, the fuel control valve 44, etc. in response to input of an input signal, such as a signal from a startup switch which is not shown.

The cooling section abnormality determining unit determines, based on a detection signal of the rotational speed of the motor 34 which drives the first cooling water pump 32 which is sent to the controller 66, that an abnormality has occurred in the first cooling water pump 32 when there is an abnormality, such as that the rotation count is zero even though operation of the pump has been requested. Alternatively, the cooling section abnormality determining unit may determine that an abnormality has occurred in the first cooling water pump 32, not by monitoring the rotational speed of the motor 34 of the first cooling water pump 32, but by detecting that disconnection or short-circuiting has occurred in the motor circuit which is not shown and which is a circuit connected to the motor 34. Alternatively, a temperature sensor which detects the temperature of the motor 34 may be provided, a detection signal of the temperature of the motor 34 from the temperature sensor may be sent to the controller 66, and the controller 66 may determine that an abnormality has occurred in the first cooling water pump 32 when the temperature of the motor 34 is abnormally reduced or increased.

In addition, the air compressor operation controlling unit controls, when it is determined that an abnormality has occurred in the first cooling water pump 32, employing feedback, rotational speed (i.e., the number of rotations per unit time) of the air compressor 18 with the motor 22 of the air compressor 18 according to the temperature of the air at the exit side (exit-side air temperature) of the air compressor 18 detected by the temperature sensor 26 so that the exit-side air temperature is less than or equal to a predetermined constant value.

Next, a method of controlling the rotational speed of the air compressor 18 by the controller 66 will be described with reference to the basic structure diagram of FIG. 1 and a flowchart of FIG. 2. When the cooling section abnormality determining unit of the controller 66 determines that an abnormality has occurred in the first cooling water pump 32 in step S1, the mode transitions to a temperature monitoring mode, in which the controller 66 causes the temperature sensor 26 to detect the exit-side air temperature after output from the air compressor 18 on the oxidation gas supply channel 14 in step S2, and the detection signal is input to the controller 66. At step S3, the air compressor operation controlling unit of the controller 66 controls, using feedback, the rotational speed of the air compressor 18 based on the detection signal from the temperature sensor 26 so that the exit-side air temperature of the portion in which the temperature is detected by the temperature sensor 26 is less than or equal to a predetermined constant temperature.

More specifically, when the rotational speed of the air compressor 18 is increased, the exit-side air temperature is increased due to adiabatic compression of the air. When, on the other hand, the rotational speed of the air compressor 18 is reduced, the exit-side air temperature is reduced. Because of this, it is possible to adjust the exit-side air temperature to a temperature less than or equal to a predetermined constant temperature by the air compressor operation controlling unit controlling the rotational speed of the air compressor 18 while monitoring the exit-side air temperature. The predetermined temperature is set to a temperature at which none of the constituent elements of the humidifier 20 and the constituent elements of the fuel cell stack 12 would be thermally degraded, that is, a temperature in which the humidifier 20 and the fuel cell stack 12 can be normally used, when the air is sent to the humidifier 20 and the fuel cell stack 12 provided downstream of the gas than the temperature sensor 26. In addition, when the rotational speed of the air compressor 18 is reduced, the flow rate of the air sent to the fuel cell stack 12 is reduced, and the generated power in the fuel cell stack 12 is limited.

In step S1, if it is determined that the state is normal and there is no abnormality occurring in the first cooling water pump 32, a value for amount of power which must be generated in the fuel cell stack 12 is calculated based on the degree of pressing of the acceleration pedal of the fuel cell vehicle, rotational speed of a driving motor (which is not shown), etc., and the controller 66 controls the rotational speed of the air compressor 18 so that the rotational speed of the air compressor 18 which is determined based on the necessary amount of power generation is obtained.

As described, because the rotational speed of the air compressor 18 is controlled according to the exit-side air temperature detected by the temperature sensor 26 when it is determined that an abnormality has occurred in the first cooling water pump 32, even when an abnormality has occurred in the first cooling water pump 32, the temperature of the air to be sent to the humidifier 20 and the fuel cell stack 12 can be set to a temperature which would not impair the performance of the humidifier 20 and the fuel cell stack 12, and the power generation operation time of the fuel cell stack 12 can be extended.

In other words, according to the present embodiment, it is possible to extend the time in which the fuel cell stack 12 operates to generate power while preventing sending of the reaction gas having an excessively increased temperature to the fuel cell stack 12. Because of this, the power generation operation time of the fuel cell stack 12 can be extended compared to the fuel cell system described in JP 2002-184435 A in which the power generation operation of the fuel cell is stopped regardless of the other conditions when an abnormality occurs in the cooling section of the intercooler.

In the case of the present embodiment in which a vehicle is equipped with the fuel cell system 10 to form a fuel cell vehicle, it is possible to prevent continued stopping of the fuel cell vehicle when an abnormality occurs in the first cooling water pump 32. Because of this, it is possible to easily execute the "limp home" driving mode, in which the fuel cell vehicle is driven to a repair facility or a safe side road without towing or transporting the fuel cell vehicle with other vehicles such as a towing vehicle, and to extend the time in which the power generation operation can be executed in which the power can be increased, to shorten the time required for "limp home" driving mode.

In the case of the present embodiment, the temperature sensor 26 is provided upstream of the humidifier 20 in the oxidation gas supply channel 14 and the temperature of air output from the air compressor 18 is detected, but alternatively, the temperature sensor 26 may be configured to detect the temperature of the air downstream of the gas than the humidifier 20 which is at the position A of FIG. 1 on the oxidation gas supply channel 14. In this case, it is possible to prevent supply of the air having an excessively increased temperature to the fuel cell stack 12. However, a configuration as described in the present embodiment in which the temperature sensor 26 is provided upstream of the humidifier 20 on the oxidation gas supply channel 14 and the temperature of the air output from the air compressor 18 is detected is more effective in view of preventing supply of the air having the excessively increased temperature to the humidifier 20.

[Second Preferred Embodiment]

Figure 3:
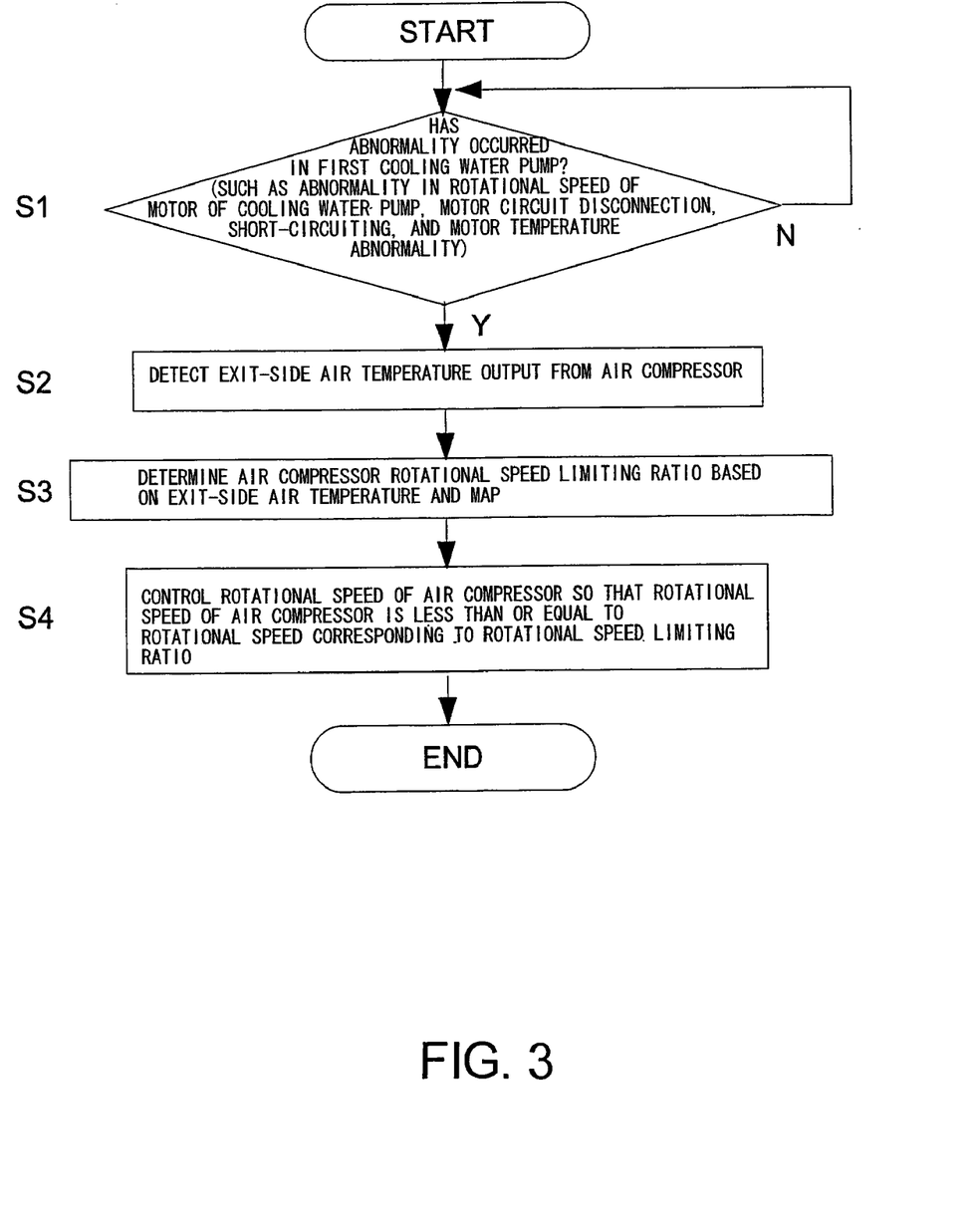
FIG. 3 is a flowchart for explaining a method for controlling the rotational speed of an air compressor in a second preferred embodiment of the present invention.
Figure 4:
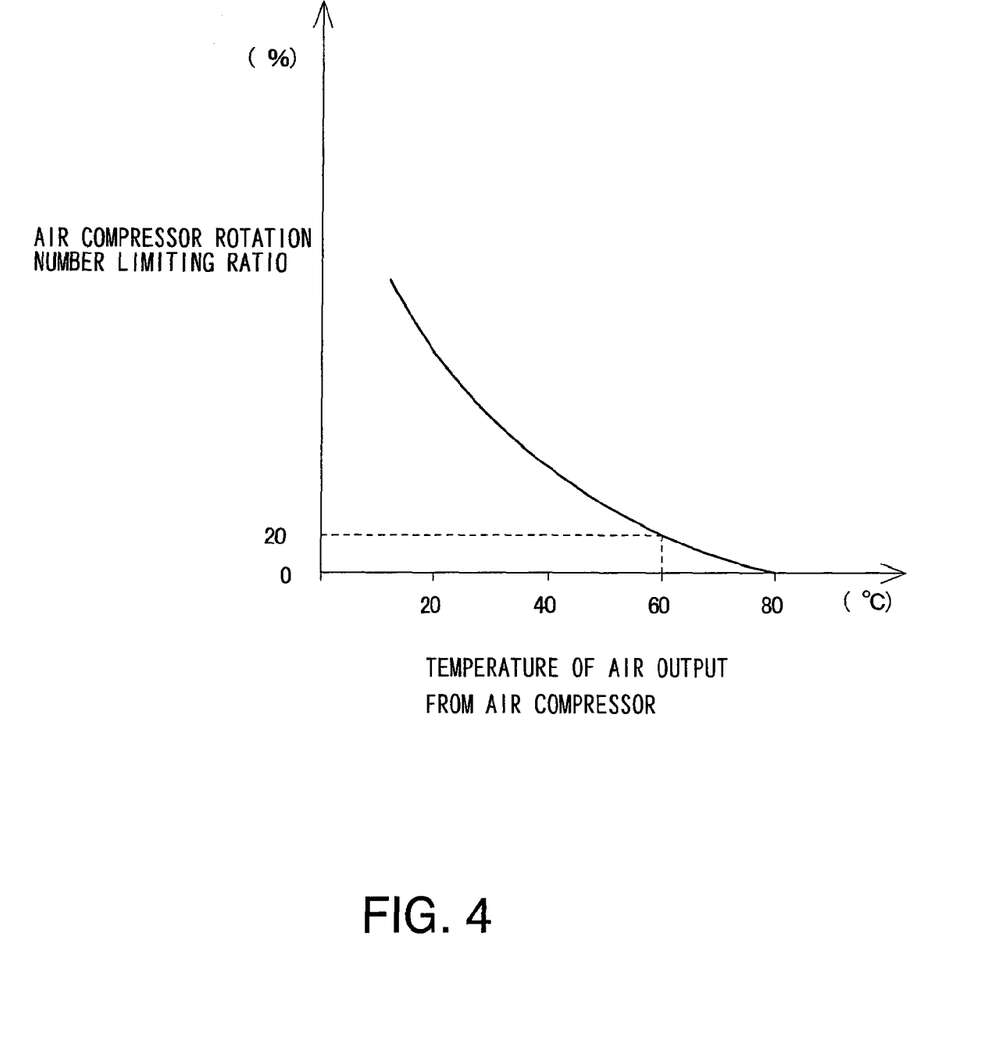
FIG. 4 is a diagram showing an example map indicating a relationship between a temperature of air after being output from an air compressor and a rotational speed limiting ratio of the air compressor, which is used in the second preferred embodiment of the present invention.

Next, FIGS. 3 and 4 show a second preferred embodiment of the present invention. In this present embodiment, the temperature sensor 26 (refer to FIG. 1) detects the exit-side air temperature which is the temperature of the air output from the air compressor 18 (refer to FIG. 1), and the controller 66 (refer to FIG. 1) determines an air compressor rotational speed limiting ratio corresponding to the detected exit-side air temperature based on data of a map as shown in FIG. 4 in the first preferred embodiment of the present invention shown with FIGS. 1 and 2. The air compressor rotational speed limiting ratio refers to a ratio of a maximum allowable rotational speed $T_B$ of the air compressor 18 corresponding to the exit-side air temperature with respect to a maximum rating rotational speed $T_A$ $(=(T_B/T_A)*100)$, and is a value related to the maximum allowable rotational speed $T_B$ of the air compressor 18. For example, when the maximum rating rotational speed $T_A$ of the air compressor 18 is 10,000 $\text{min}^{-1}$ (r.p.m.), a rotational speed limiting ratio of 50% corresponds to the case where the maximum allowable rotational speed $T_B$ of the air compressor 18 is 5000 $\text{min}^{-1}$ (r.p.m.). The basic structure of the fuel cell system of the present embodiment is similar to the first preferred embodiment shown in FIG. 1, and, thus, portions equivalent to those illustrated in FIG. 1 will be described using the reference numerals shown in FIG. 1.

In the case of the present embodiment, a map as shown in FIG. 4 which indicates a relationship between the exit-side air temperature which is the temperature of the air output from the air compressor 18 and a rotational speed limiting ratio which is set corresponding to the exit-side air temperature is created in advance. In this map, the rotational speed limiting ratio is reduced as the exit-side air temperature is increased. By controlling the rotational speed of the air compressor 18 to a number less than or equal to the rotational speed corresponding to the rotational speed limiting ratio, it is possible to set the exit-side air temperature of the air output from the air compressor 18 to be less than or equal to the limit temperature (80° C. in the example configuration of FIG. 4) which is a temperature which would not impair the performance of the humidifier 20 and the fuel cell stack 12. In FIG. 4, the rotational speed limiting ratio is set to 0 when the exit-side air temperature is 80° C. However, that configuration is only an example which shows a tendency of the relationship between the temperature and the rotational speed limiting ratio of the map, and the map which is used in the present embodiment is not limited to the map of FIG. 4. For example, the relationship between the rotational speed limiting ratio and the exit-side air temperature of the map is suitably determined according to thermal tolerance or the like of the constituent elements of the humidifier 20 and the fuel cell stack 12.

The data for the map is pre-stored in a memory of the controller 66, which determines the rotational speed limiting ratio corresponding to the temperature based on the data of the map and the exit-side air temperature detected by the temperature sensor 26 in step S3 of FIG. 3. In step S4, the air compressor operation controlling unit of the controller 66 controls the air compressor 18 so that the rotational speed of the air compressor 18 is less than or equal to the maximum allowable rotational speed corresponding to the rotational speed limiting ratio. For example, when the data of the map of FIG. 4 is used, if the maximum rating rotation number of the air compressor 18 is 10,000 $min^{-1}$ and the detected exit-side air temperature is 60° C., the air compressor 18 operation controlling unit controls the operation of the air compressor 18 so that the rotational speed of the air compressor 18 is less than or equal to 2000 $min^{-1}$ corresponding to the rotational speed limiting ratio of 20%. If the exit-side air temperature is 80° C. in a similar configuration, the air compressor operation controlling unit sets the rotational speed of the air compressor 18 to 0, that is, the air compressor operation controlling unit stops the rotation of the air compressor 18.

In the present embodiment, similar to the first preferred embodiment described above, it is possible to extend the time in which the fuel cell stack 12 operates to generate power while preventing supply of the reaction gas having an excessively increased temperature to the fuel cell stack 12. Alternatively, it is also possible to employ a configuration in which, when the maximum rating rotation number of the air compressor 18 is determined in advance, a map indicating a relationship between the exit-side air temperature and the maximum allowable rotation number itself of the air compressor 18 which is set corresponding to the exit-side air temperature is created in place of the map shown in FIG. 4 and the data of the map is used.

As other structures are similar to those of the first preferred embodiment, their description is not repeated.

[Third Preferred Embodiment]

Figure 5:
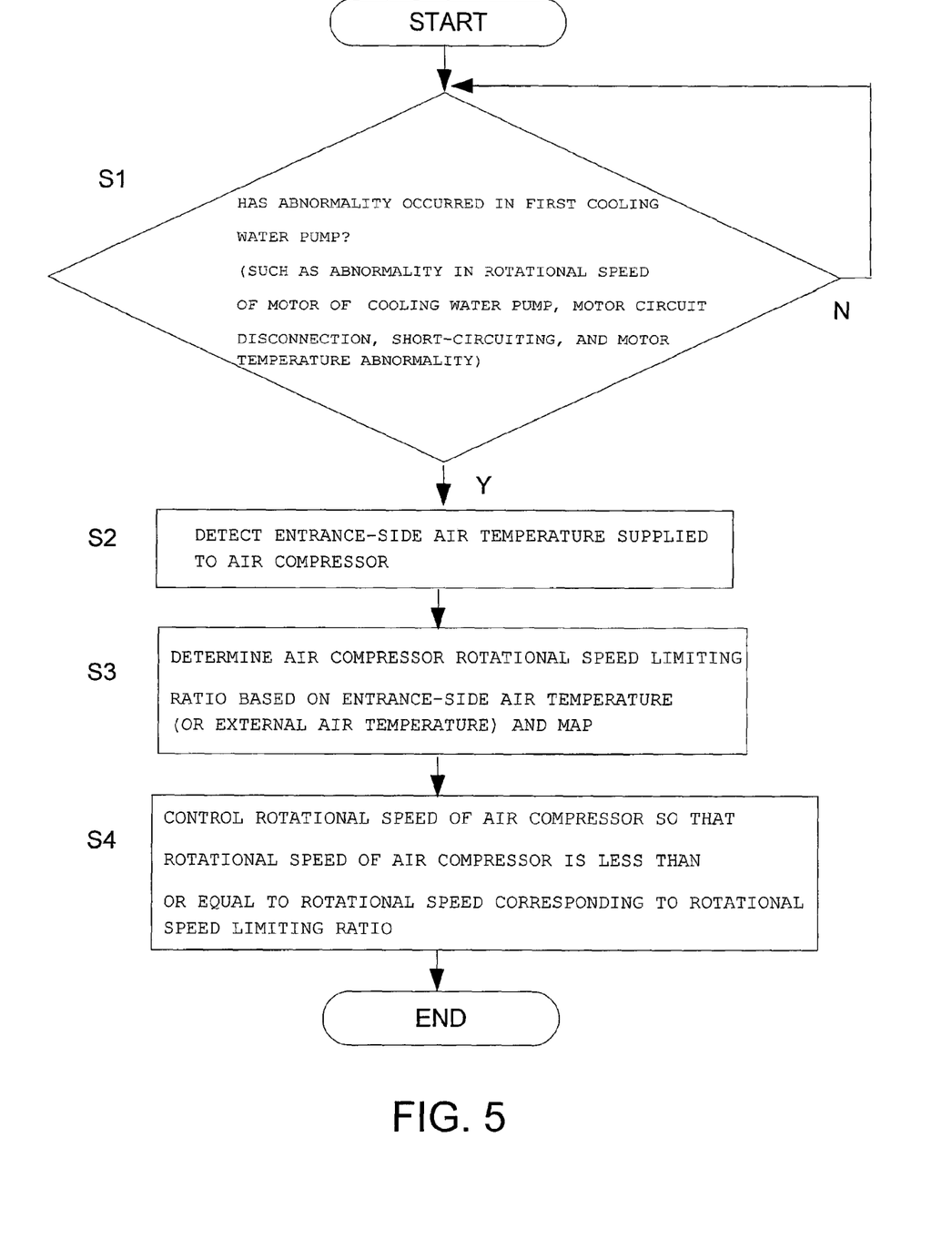
FIG. 5 is a flowchart for explaining a method for controlling the rotational speed of an air compressor in a third preferred embodiment of the present invention.

Next, FIG. 5 shows a third preferred embodiment of the present invention. In this present embodiment, the temperature sensor 26 (refer to FIG. 1) does not detect the exit-side air temperature of the air output from the air compressor 18 (refer to FIG. 1), but instead detects an entrance-side air temperature which is a temperature of air before being supplied to the air compressor 18. More specifically, in the oxidation gas supply channel 14 (refer to FIG. 1), the temperature of air inside the channel at a position (position B in FIG. 1) between the air cleaner 16 (refer to FIG. 1) and the air compressor 18 is detected by the temperature sensor 26. The detection signal from the temperature sensor 26 is sent to the controller 66 (refer to FIG. 1). As the basic structure of the fuel cell system of the present embodiment is also similar to the first preferred embodiment shown in FIG. 1, the portions equivalent to those illustrated in FIG. 1 will be explained using the reference numerals shown in FIG. 1.

In the case of the present embodiment, an increase in the temperature due to the temperature increase by adiabatic compression of air in the air compressor 18 is predicted from the entrance-side air temperature before being supplied to the air compressor 18, and the air compressor operation controlling unit controls the rotational speed of the air compressor 18 so that the temperature of the air is less than or equal to a temperature which would not impair the performance of the constituent elements of the humidifier 20 and the fuel cell stack 12, even when the air after passing the air compressor 18 is sent to the humidifier 20 and the fuel cell stack 12. For this purpose, in the present embodiment, a map which indicates a relationship between the entrance-side air temperature of the air to be sent to the air compressor 18 and a rotational speed limiting ratio of the air compressor 18 which is set corresponding to the entrance-side air temperature is created. The meaning of the rotational speed limiting ratio is similar to that in the second preferred embodiment shown in FIGS. 3 and 4.

A curve of the map of the present embodiment is positioned at a position lower than the curve of the map of FIG. 4 when the temperature on the horizontal axis is set as the entrance-side air temperature of the air before being supplied to the air compressor 18. In other words, in consideration of temperature increases resulting from the passing of the air through the air compressor 18, the rotational speed limiting ratio corresponding to the entrance-side air temperature is set lower than the rotational speed limiting ratio corresponding to the exit-side air temperature after output from the air compressor 18 in the case of FIG. 4. The controller 66 stores the map data in a memory.

During a power generation operation, when the cooling section abnormality determining unit of the controller 66 determines that an abnormality has occurred in the first cooling water pump 32 in step S1 of FIG. 5, the mode transitions to the temperature monitoring mode, in which the controller 66 causes the temperature sensor 26 to detect the entrance-side air temperature of the air compressor 18 on the oxidation gas supply channel 14 in step S2, and the detection signal is input to the controller 66. At step S3, the air compressor operation controlling unit of the controller 66 determines the rotational speed limiting ratio corresponding to the entrance-side air temperature based on the detected value of the entrance-side air temperature indicated by the detection signal of the temperature sensor 26 and the data of the map. Then, in step S4, the air compressor operation controlling unit controls the operation of the air compressor 18 so that the rotational speed of the air compressor 18 is less than or equal to the maximum allowable rotational speed corresponding to the determined rotational speed limiting ratio.

The rotational speed limiting ratio is set corresponding to a maximum allowable rotational speed at which none of the constituent elements of the humidifier 20 and the constituent elements of the fuel cell stack 12 would be thermally degraded, that is, the humidifier 20 and the fuel cell stack 12 can be normally used, when the air which has passed through the air compressor 18 is sent to the humidifier 20 and the fuel cell stack 12.

In this manner, because the rotational speed of the air compressor 18 is controlled according to the entrance-side air temperature detected by the temperature sensor 26 when an abnormality is detected in the first cooling water pump 32, even when an abnormality occurs in the first cooling water pump 32, the temperature of the air to be sent to the humidifier 20 and the fuel cell stack 12 can be set to a temperature in which no problem in performance is caused in the humidifier 20 and the fuel cell stack 12, and, in addition, the power generation operation time of the fuel cell stack 12 can be extended. In addition, in the present embodiment, the temperature sensor which detects the temperature of the air output from the air compressor 18 can be omitted.

In the case of the present embodiment, the temperature of the air upstream of the gas than the air compressor 18 in the oxidation gas supply channel 14 is detected by the temperature sensor 26. Alternatively, it is also possible to provide the temperature sensor 26 at a location at which the temperature of the external air other than the oxidation gas supply channel 14 can be detected and to input the detection signal indicating the external air temperature detected by the temperature sensor to the controller 66. When the maximum rated rotational speed of the air compressor 18 is determined in advance, it is also possible to create a map indicating a relationship between the entrance-side air temperature and the maximum rotational speed of the air compressor 18 itself which is set corresponding to the entrance-side air temperature in place of the map which indicates a relationship between the entrance-side air temperature and the rotational speed limiting ratio of the air compressor 18, and use the data of this map.

As other structures are similar to those of the second preferred embodiment shown in FIGS. 3 and 4, their description is not repeated.

In the above-described preferred embodiments, the controller 66 controls the rotational speed of the air compressor 18 according to the temperature of the air detected by the temperature sensor 26 when it is determined that an abnormality has occurred in the first cooling water pump 32 for the intercooler 24. The present invention, however, is not limited to such a configuration. For example, a configuration may be employed in which the cooling section abnormality determining unit determines presence or absence of the occurrence of the abnormality such as failure and damaging in the other constituent elements of the cooling section of the intercooler 24 such as the first coolant channel 30 through which the coolant for cooling the intercooler 24 flows and the first radiator 36, and, when it is determined that an abnormality has occurred, the air compressor operation controlling unit controls the rotational speed of the air compressor 18 according to the temperature of the air detected by the temperature sensor 26.

In addition, in the above-described preferred embodiments, the intercooler 24 and the fuel cell stack 12 are cooled by two separate cooling sections provided with separate cooling water pumps 32 and 60. The present invention, however, can be applied in a structure in which a common cooling section is employed between the intercooler 24 and the fuel cell stack 12. In this case, one of the first cooling water pump 32 and the second cooling water pump 60 can be omitted and one of the first radiator 36 and the second radiator 62 can be omitted, and, thus, the number of components can be reduced and the cost can be reduced.

The present invention is not limited in the structure of the fuel cell stack, and various structures, including structures which are conventionally known, can be employed.

INDUSTRIAL APPLICABILITY

The present invention is used in a fuel cell system. For example, the present invention is used in a fuel cell system which is equipped in and used in a fuel cell vehicle.

The invention claimed is:
1. A fuel cell system comprising:
a fuel cell which generates power through an electrochemical reaction of reaction gases;
a gas supply channel through which the reaction gas is supplied to the fuel cell;
a gas supplying device provided on the gas supply channel;
a temperature detecting unit which detects a temperature of the reaction gas;
an intercooler which cools a gas which has passed through the gas supplying device;
a coolant channel through which a coolant which cools the intercooler flows;
a coolant pump provided on the coolant channel; and
a controller, wherein
the controller comprises a cooling section abnormality determining unit which is programmed to determine the presence or absence of an abnormal state of the coolant pump, and a gas supplying device operation controlling unit which is programmed to control, when it is determined that an abnormality has occurred in the coolant pump, a rotational speed of the gas supplying device is increased or decreased so that the temperature of the reaction gas is less than or equal to a predetermined value according to the temperature of the reaction gas detected by the temperature detecting unit, and
wherein the cooling section abnormality determining unit is programmed to determine the presence or absence of an occurrence of an abnormality of the coolant pump based on a detection signal indicating a rotational speed of a coolant pump motor when there is a request to rotate the coolant pump motor which drives the coolant pump, based on detection of occurrence of disconnection or short-circuiting in a circuit connected to the coolant pump motor, or based on an abnormal decrease or an abnormal increase in a temperature of the coolant pump motor.

2. The fuel cell system according to claim 1, wherein the gas supplying device is a gas compressor.

3. The fuel cell system according to claim 2, wherein the rotational speed is controlled by the controller based on data of a map indicating a maximum allowable rotational speed of the gas compressor which is set corresponding to the temperature of the reaction gas or a related value of the maximum allowable rotational speed.

4. The fuel cell system according to claim 1, wherein a humidifier is located on the gas supply channel such that reaction gas in the gas supply channel can first pass through the intercooler, then pass through the humidifier, and then pass into the fuel cell, and
wherein the temperature detecting unit is located such that temperature of reaction gas in the gas supply channel can be monitored, the reaction gas can then pass through the humidifier, and then can pass into the fuel cell.

5. The fuel cell system according to claim 1, wherein
the gas supply channel is an oxidation gas supply channel through which an oxidation gas which is a reaction gas is supplied to the fuel cell, and
wherein the gas supply channel is configured such that during the operation of the fuel cell, the oxidation gas supplied to the fuel cell via the gas supplying device and the gas supply channel passes through the intercooler.

6. The fuel cell system according to claim 1, wherein
the gas supplying device operation controlling unit is programmed to control, when it is determined that an abnormality has occurred in the cooling section of the intercooler, the operation state of the gas supplying device according to a temperature, detected by the temperature detecting unit, of the reaction gas which is a reaction gas which has passed through the intercooler.

7. The fuel cell system according to claim 1, wherein
the cooling section of the intercooler comprises the coolant channel, and the coolant pump and a radiator which are provided on the coolant channel.

* * * * *